United States Patent [19]

Hurst

[11] Patent Number: 4,849,237

[45] Date of Patent: Jul. 18, 1989

[54] METHOD FOR SANITIZING POULTRY CARCASSES IN A POULTRY PROCESSING PLANT UTILIZING OZONATED WATER

[76] Inventor: William D. Hurst, R.R. #2, 64J, Bates City, Mo. 64011

[21] Appl. No.: 114,709

[22] Filed: Oct. 30, 1987

[51] Int. Cl.⁴ .......................... A22C 21/00; A23B 4/14
[52] U.S. Cl. ................................... 426/332; 426/321; 426/474; 426/532; 426/644
[58] Field of Search ............... 426/332, 321, 644, 474, 426/532, 281, 506; 422/28, 30, 31, 32

[56] References Cited

U.S. PATENT DOCUMENTS

| | | | |
|---|---|---|---|
| 2,524,182 | 10/1950 | Teigen | 426/506 |
| 4,021,585 | 5/1977 | Svoboda et al. | 426/332 |
| 4,309,388 | 1/1982 | Tenney et al. | 422/30 |

OTHER PUBLICATIONS

Sheldon et al., 1986. Journal of Food Science, vol. 51, No. 2, pp. 305–309.

Primary Examiner—Donald E. Czaja
Assistant Examiner—Helen Pratt
Attorney, Agent, or Firm—Kokjer, Kircher, Bradley, Wharton, Bowman & Johnson

[57] ABSTRACT

A method for sanitizing poultry carcasses utilizing ozonated water applicable to a mass poultry processing facility. Ozonated water is produced to a concentration of at least 0.5 parts per million ozone in water and introduced into a trough through which partially processed poultry carcasses can be fully immersed. The trough is equipped with rows of nozzles along the bottom that are directed into the trough to stream jets of ozonated water into the inner body cavity of a poultry carcass and at the back side of the carcass as it moves through the trough. The trough is filled with ozonated water, at a temperature of about 33° F., in addition to the jets of ozonated water from the nozzles. The carcasses are immersed into the trough at a downstream location and move through the trough upstream against the flowing ozonated water. The carcass is placed on a rack that holds the carcass upright while moving through the trough. The bacteria present on a carcass is substantially reduced following treatment by the method of this invention.

11 Claims, 2 Drawing Sheets

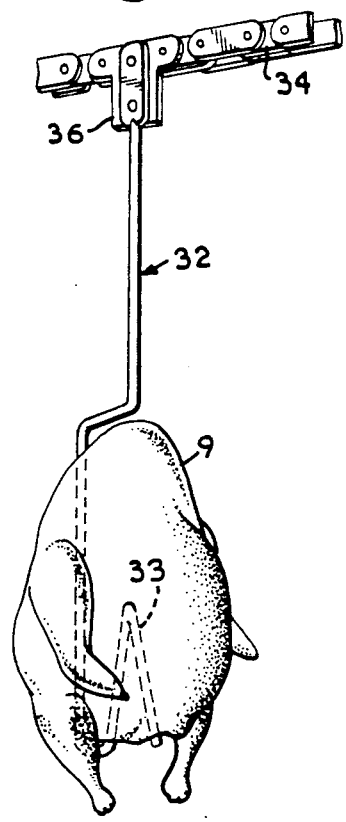
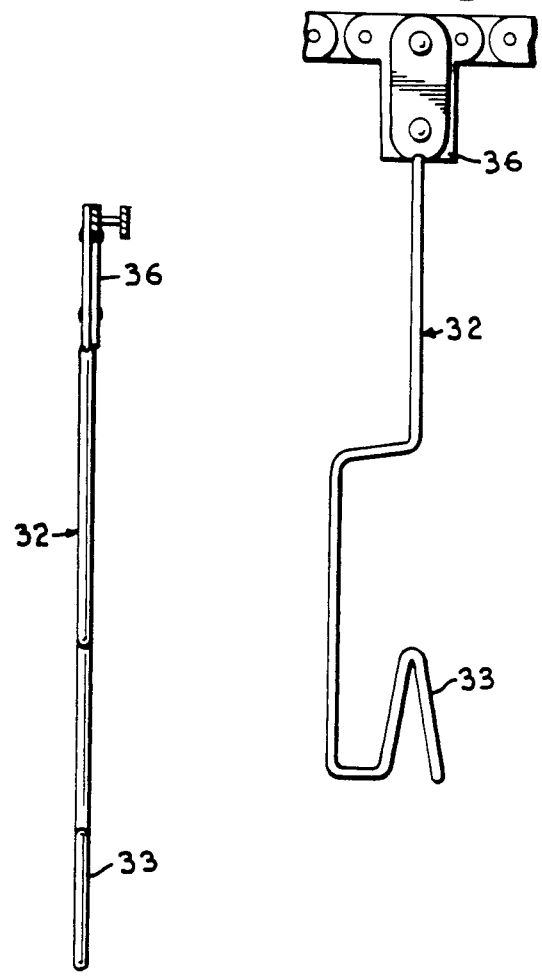
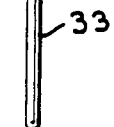
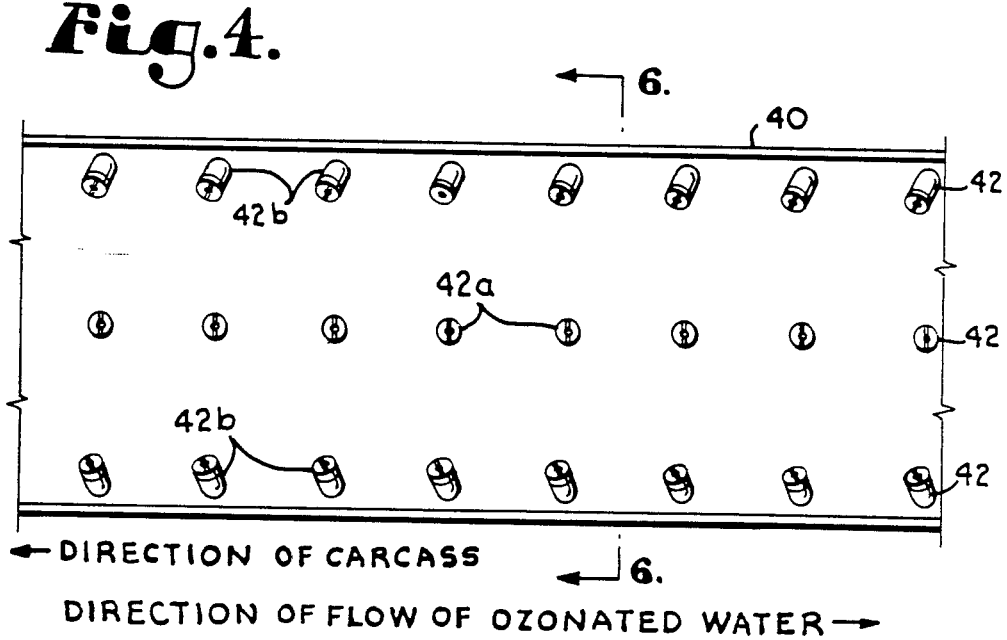
DIRECTION OF CARCASS
DIRECTION OF FLOW OF OZONATED WATER →

METHOD FOR SANITIZING POULTRY CARCASSES IN A POULTRY PROCESSING PLANT UTILIZING OZONATED WATER

This invention relates in general to a method for sanitizing food products and more particularly to a method whereby a poultry carcass is subjected to ozonated water in order to reduce the bacterial flora present on the carcass.

It has become increasingly important in the food industry in general, and the poultry industry in particular, to provide a sanitary product to the public. A health conscious and knowledgeable public require that the food products available on the market be of the highest quality. Food products must be safe and free from undesirable side effects due to disease causing bacteria or harmful chemicals being present on the product. Food processors must also meet governmental health and safety regulations and are always in need of a safe, economical, and efficient method to comply with these regulations.

Some form of bacteria can be found on virtually every object in our environment. Likewise, bacteria are present on most living organisms, such as poultry, and are indeed even associated with some of the chemical processes that occur within the organism. Many bacteria are beneficial to both man and the environment and life could not proceed without them. But others are harmful, especially those that are capable of causing sickness or disease in man. Some of the more pathogenic bacteria are those classified as Enterobacteriaceae and include such organisms as *Escherichia coli, Salmonella spp,* and *Enterobacter spp.* These bacteria are normally found within the intestinal flora of mammals and are considered responsible for such intestinal infections as bacterial dysentery and bacterial food poisoning. Although the presence of these bacteria often exist without causing any disease, it is believed that large scale food preparation often provides a favorable environment for the growth of these organisms.

The problem of disease causing bacteria exists in the poultry processing industry. Bacteria of the Enterobacteriaceae group are inherent on the outside of poultry carcasses and as a normal member of their intestinal flora. A typical poultry processing plant operates in a mass production line manner and can serve as a breeding ground for these bacteria. The most likely breeding ground for bacteria in the poultry processing plant is at the "chiller" stage. At this stage, the poultry has already been killed, plucked, scalded, and eviscerated. The resulting carcass is then placed in "chiller water" to bring the temperature of the carcass to around 33° F. Typically the chiller stage immediately follows the evisceration stage where the inner organs of the poultry have been removed. During that process, many of the inherent internal or intestinal bacterial flora of the animal are released into the processing facility. Some of these bacteria may remain on the inside of the carcass as a result of the evisceration process. When these carcasses are then placed in the chiller water, some of the bacteria may wash off into the chiller water and contaminate the water and carcasses that are subsequently placed in the chiller water. Rinsing the carcass after leaving the chiller water may reduce the bacteria on the outside of the carcass, but a mere washing of the exterior of the carcass is not effective in reducing the bacteria remaining within the body cavity. Even a "post-chiller" rinse is not greatly effective in reducing the bacteria on the outer skin of the poultry to an acceptable level.

Previous attempts have been made to control the bacteria present in chiller water and to disinfect the chiller water in a poultry processing plant. One such method utilized the addition of chlorine to the chiller water. While it is true that chlorine is an effective disinfectant and does reduce the bacteria in chiller water, the use of chlorine can leave a residue of chlorine on the carcass. Not only is the odor of chlorine objectionable to most consumers, but chlorine can take the form of chloramines when it combines with organic compounds and such chloramines are known to be carcinogenic.

Another attempt to disinfect chiller water used hydrogen peroxide as a biocide in the water. Again, hydrogen peroxide was effective in reducing the bacteria in the water, but the major drawback to its use is that it creates a change in the appearance of the carcass skin to a milky white color making the poultry carcass objectionable to pass to the consumer.

It is further known that ozone can be used to disinfect water. Ozone has also been used in various food industries. Some particular applications use ozone to cleanse shellfish or to preserve fish. Many of the applications utilizing ozone in the food industry use ozone in the gaseous form for a sterilization process. But gaseous ozone creates a number of environmental problems. Breathing air having a concentration of greater than 0.1 part per million (ppm) of ozone is harmful if breathed for extended periods of time. Additionally, the pungent odor of gaseous ozone is considered very objectionable.

It has also been shown that ozonated water is an effective disinfectant against bacteria on poultry carcasses and in the associated chiller water in laboratory tests. None of the previous attempts at disinfecting chiller water or sanitizing food products utilize a method that fully washes the inside and outside of the product. None of these attempts utilized a flowing, turbulent liquid system that achieves complete, intimate contact of the product with the sanitizer. Thus the problem of sanitizing poultry carcasses from harmful bacteria in the mass processing of poultry has not heretofore been addressed.

It is thus evident that a need exists in the poultry processing industry for a method for sanitizing poultry carcasses utilizing ozonated water that provides a safe, effective and practical method applicable to a mass processing facility. In accordance with the invention, a poultry carcass, after it has been partially processed, is immersed in a trough of chilled, flowing ozonated water while being subjected to jets of ozonated water directed into the body cavity of the carcass and along the outside of the carcass. The carcass is fully immersed in this flowing ozonated water and carried through the trough against the current of the ozonated water to create a turbulent, swirling wash of the carcass such that the entire carcass is in intimate contact with the ozonated water. Additionally, the jets of ozonated water create more turbulence and shoot streams of ozonated water at the carcass as it flows through the trough. The water is ozonated to a concentration sufficient to act as bactericide, yet not harmful to the carcass itself, the employees involved in the process, or the environment.

It is therefore a primary object of this invention to provide a method of sanitizing poultry carcasses on-line in a poultry processing plant.

As a corollary to the primary objective it is an object of the present invention to provide a method of simultaneously sanitizing the chiller water associated with a poultry processing plant.

It is a further object of the present invention to utilize ozonated water as an economical, efficient, safe and universally applicable method of reducing bacteria in and on a partially processed carcass in a mass processing facility by immersing the carcass in flowing ozonated water and moving the carcass against the stream of ozonated water while subjecting it to jets of ozonated water directed at the inside cavity of the carcass and to the outer skin of the carcass creating a turbulence around the carcass as it flows through the trough to effectuate complete contact of the carcass with the ozonated water.

It is a still further object of this invention to provide a method for sanitizing poultry products utilizing ozonated water that reduces the possibility of bacteria caused sickness or disease in consumers.

It is another object of the present invention to provide a method for sanitizing poultry products utilizing ozonated water that extends the shelf-life of the treated carcass.

It is an aim of this invention to provide a method for sanitizing poultry carcasses utilizing ozonated water that can be performed in an on-line processing plant without leaving harmful chemical residues on the carcass.

It is a further aim of the present invention to provide a method for sanitizing poultry utilizing ozonated water that creates an environmentally safe work place with virtually no ozone offgas.

Other objects of the invention will be made clear or become apparent from the following description and claims when read in light of the accompanying drawings which form a part of the specification and are to be read in conjunction therewith and in which like reference numerals are used to indicate like parts in the various views.

BRIEF DESCRIPTION OF THE DRAWINGS

FIG. 1 is a perspective view of a poultry carcass on a preferred embodiment of a rack to be used in conjunction with the method of this invention.

FIG. 2 is a side view of the rack.

FIG. 3 is a front view of the rack.

FIG. 4 is a top view of a trough of the present invention showing the nozzle placement.

Figure 7:
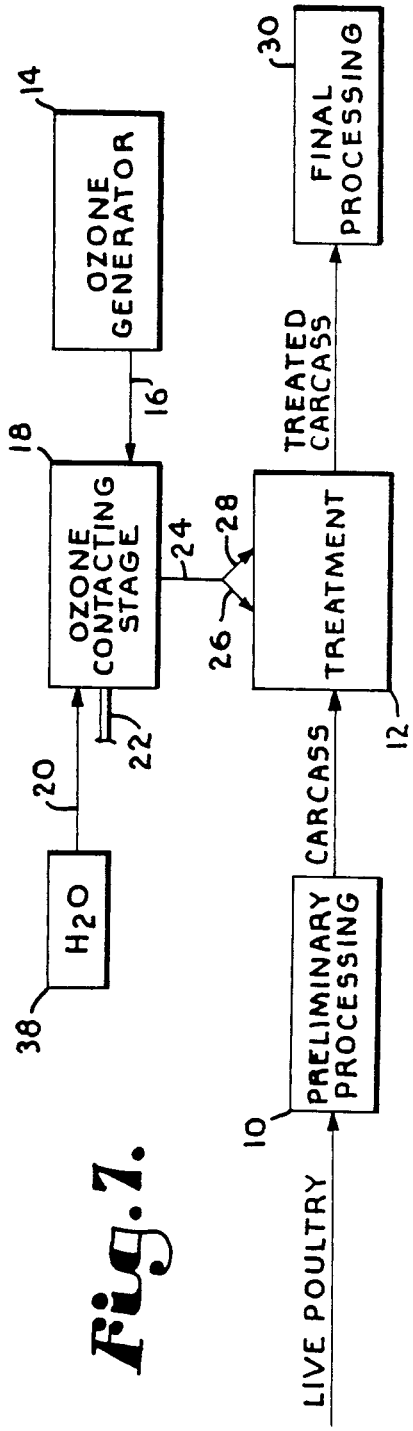
FIG. 7 is a schematic flow chart of the method for sanitizing poultry carcasses.

The preliminary processing steps of a poultry processing plant are generally denoted 10 in FIG. 7. The preliminary steps to be described are those typical of a poultry processing plant, but particular deviations or alternative method are contemplated in individual facilities. When chickens or other poultry are brought to the processing facility, they are initially placed on a conveyor belt or similar moving track. This conveyor moves the chickens into the processing building itself. The building is normally kept dark and is illuminated by red light. It has been found that this red light keeps the chickens quiet and calm. The chickens are sprayed with a fine mist of water as they proceed along the conveyor to enhance the electrical conductivity of the chicken for the stunning area. The chickens continue moving to the electrical shocking area that stuns each chicken so that it can be easily processed in the subsequent steps. All of the preceding steps normally take place in a single room or area that is often partitioned off from the other rooms of the facility by plastic curtains or the like. This is often referred to as Room #1.

Figure 5:
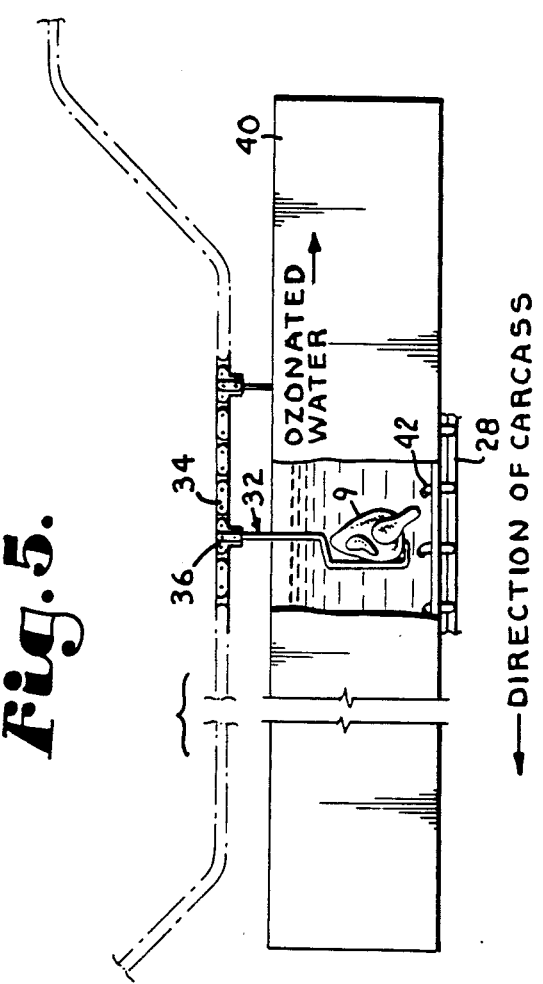
FIG. 5 is a cut-away view illustrating the placement of the carcass on the rack in the trough during the process.

The stunned chickens are then moved into room or zone #2. The chicken is manually placed on a moving rack that holds the chicken upside down by its hocks. One type of rack 32 is shown in FIG. 5 having a trolley 34 and shackle 36 arrangement which is powered by an electric or a hydraulic motor, preferably hydraulic, that moves the rack through the steps of the process. Once on the rack, the throat of the chicken is slit by a slitter and the chicken is allowed to bleed into a tray. The chicken is next placed into a scalder. The chicken is normally immersed in water having a temperature between a range of 160° F. to 210° F. at this stage. Following this step the chicken is sent to the first picker that removes the feathers from the chicken. The picker normally comprises a set of rubber fingers that beat against the body of the chicken to remove the feathers. This plucked chicken is then sent to a second scalder stage and then to a second picker where the difficult feathers, especially those around the neck area, are removed. The chicken is then decapitated and its feet are cut off in a feet cutter area. At this point the chicken drops off of the rack and onto another conveyor. As the chickens move into a third room or zone they are manually hung on hooks or racks where the chicken is again hung upside down and is normally attached to the hooks by its hocks. The chicken is then eviscerated. Here the chicken is cut through its midsection and its intestines and internal organs are pulled out. It is at this point that the intestinal bacterial flora of the chickens are released. These internal organs drop into a sorter tray and the chickens, or resulting carcass, on the moving rack continue into a chiller zone. These carcasses are placed in chiller water for a period of time sufficient to bring their temperature to approximately 33° F. The carcasses are moved from one end of the chiller to another by means of a screw auger that moves the carcasses forward through the trough. The water for this step is normally from an outside source and is often kept circulating in the bath or trough. The water can be chilled by ice or by refrigeration methods. At this point the carcasses are typically ready for a final processing and packaging stage and it is at this point that the sanitizing treatment utilizing ozonated water is incorporated into the processing sequence. The approximate length of time for the preliminary processing is about five minutes from the time the chickens are unloaded onto the initial conveyor belt or moving track to the chiller stage.

The carcass processed to this point is then subjected to the ozonated water treatment of this invention, and that treatment is designated 12 in FIG. 7. In order to supply ozonated water to the poultry processing facility, and to the ozonated water treatment area in particular, ozone must first be created and solubilized into water.

There are two primary methods of creating ozone from air; by an ultraviolet light generator light system or by an electrical discharge system. The ozone in this invention is created by an ultraviolet light type generator and is generally denoted by the numeral 14 in FIG. 7. An ultraviolet light ozone generator typically consists of multiple ultraviolet light tubes within an aluminum housing. In a multiple tube apparatus, air enters the generator cavity and is subjected to the ultraviolet light and the ultraviolet light causes a disassociation of the oxygen molecules, which exists as $O_2$, to 2 O oxygen atoms. Some of these oxygen atoms attach themselves to oxygen molecules to form ozone. The basic equations are:

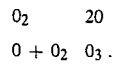

The resulting ozone and sterile air mixture, comprising approximately 0.2 percent of ozone by weight/weight of air, is then passed via a duct, generally designated 16 in the accompanying FIG. 7, to a water contacting tower.

This contacting stage, generally denoted by the numeral 18, is positioned adjacent to the ozone generator 14 and is connected to the ozone generator via duct 16. The contacting stage 18 comprises a water tower containing water in an amount sufficient to supply the ozonated water treatment area, and can be the single source for all of the water needs in the processing facility including the chiller water or can be a separate source just for the ozonated water treatment area 12. The contacting stage 18 can be a single water tower or can be a plurality of interconnected towers. A water line is connected to the top of the tower and is generally denoted 20 in FIG. 7 such that water from an outside source 38 flows into the tower from the top. Ozone duct 16 is connected at the bottom of the contacting tower such that the incoming ozone/air mixture enters the contacting tower at the bottom. This ozone/air mixture enters the tower as a fine mist or a bubble stream and is allowed to bubble up the contacting tower to completely contact with the water. By having the water flowing downward and the bubble stream going upward, a better mixture of ozone and water is achieved and a maximum amount of ozone can be solubilized into the water. The preferred embodiment of the contacting stage consists of a pair of sealed water towers of dimensions 10 feet high and 18 inches in diameter. A first tower has a water inlet 20 at its top, an incoming ozone duct 16 at the bottom and a pipe connecting the bottom of the first tower to the top of the second tower. A baffle plate is positioned within this first tower between the incoming ozone duct and outgoing water pipe to prevent the ozone from flowing directly out of the tower before bubbling up the tower. The second tower already has ozonated water from the first tower flowing in from the top through the connecting pipe and an ozone duct 16 connected to the bottom from the ozone generator to bubble more ozone/air from the ozone generator up this tower also. A typical ozone/air bubble will typically be in contact with the water for approximately 20 seconds as it moves from the bottom to the top of the tower.

Connected to the ozone contacting stage 18 is an indicator 22. This indicator constantly monitors the water in the towers of ozone contacting stage 18 and measures the concentration of ozone in the water in the tower. For ozone to be an effective bactericide the concentration of ozone in water must be at least greater than 0.5 parts per million (ppm) and preferably within the range of 0.5 parts per million 0.75 parts per million. Once the concentration of ozone in the water in the contacting tower has achieved a value of greater than 0.5 parts per million it is in condition to be brought into the processing facility for use as a sanitizer of the poultry carcasses. It has been found that the concentration of ozone in water at this point is approximately 0.1 percent weight of ozone/weight of water. Ozonated water duct 24 carries the ozonated water from the contacting tower into the facility for the sanitizing treatment. In order to maintain the concentration of ozone in the water to at least 0.5 parts per million from the contacting tower back to the facility, ozonated water duct 24 can be equipped with baffles so that the ozonated water is continually mixed and the ozone remains solubilized in the water as it travels into the facility.

In the ozonated water treatment area 12 at least one-half gallon of ozonated water per carcass entering into the ozonated water treatment area must be supplied. Thus, depending on the size of the facility, the size of the contacting tower depends upon the number of carcasses to be processed. To meet these water demands in a typical facility, ozonated water line 24 consists of a three inch pipe from the contacting tower to the facility. But it is envisioned that larger or smaller pipes may be used depending on the size of the facility and the number of carcasses being processed. It is also necessary to be sure that the ozonated water from the contacting tower into the poultry processing facility, and the ozonated water treatment zone in particular, be chilled to approximately 33° F. It has been found that ozone is more efficiently solubilized in water, and is more effective as a bactericide, if it is maintained at about 33° F. during the process. The ozonated water can be chilled by refrigeration methods or by the addition of ice.

The entire ozone generating stage and contacting tower stage of the method is conducted outside of the processing plant production line itself. This is to prevent ozone from being released into the atmosphere of the work place and creating a health hazard to the employees. It is believed that any method of creating ozone and solubilizing it with water such that it does not escape into the environment would embody the goals of the present invention.

Figure 6:
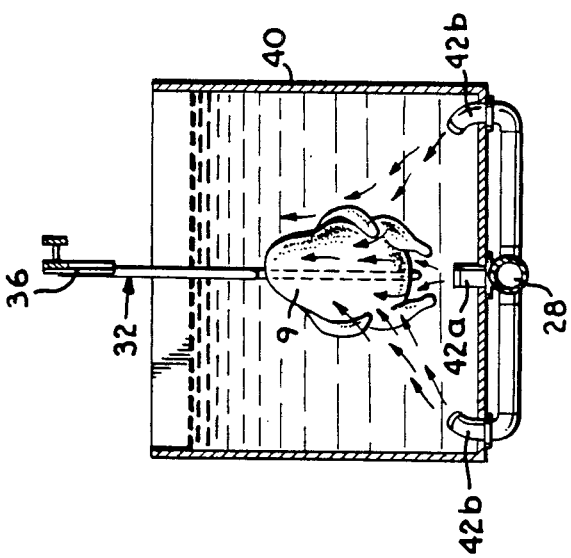
FIG. 6 is a view through line 6—6 in FIG. 4 illustrating the ozonated water flow from the nozzles as a carcass passes through the trough.

The ozonated water treatment zone of the poultry processing facility can either be in a separate room or can be connected with the final stage of the preliminary processing steps. In the ozonated water treatment zone 12 the temperature of the ozonated water is to be kept approximately 33° F. The ozonated water treatment area consists of a trough 40 or other container as depicted in FIG. 5 to receive the ozonated water. The trough of the preferred embodiment of this invention is about 18 inches deep and approximately 90 feet long. The trough 40 must be sufficient to received at least one-half gallon of ozonated water per carcass going through the process such that the entire carcass can be immersed in the water. This trough can be either linear or circular although a circular trough will more efficiently use available space. As the ozonated water enters the facility through ozonated water duct 24 it is split by a "Y" connection forming two lines or pipes each being one and one-half inches in diameter. One pipe 26 delivers a flow of ozonated water into the trough 40 at an upstream location directly into the trough in order to fill the trough. The second line 28 is also one and one-half inches in diameter and takes approximately one-half of the ozonated water flow and it is directed along the bottom of the trough. As seen in FIG. 6, pipe 28 has a plurality of rows of nozzles 42 attached to this pipe that extend into the trough 40. The ozonated water flowing through the pipes is subject to a pressure of approximately 20 PSI so that a current of water is created in the trough from pipe 26 and streams or jets of ozonated water are forced through the nozzles 42 from pipe 28 and directed from the bottom of the trough 40 up and into the middle area of the trough. These nozzles 42 are one-eighth inch diameter nozzles so that the streams of ozonated water are released from the nozzles at a sufficiently high pressure. A row consists of three nozzles and is placed approximately every six inches along the trough. As best shown in FIG. 4, a middle nozzle 42a is directed approximately straight up the middle of the trough, whereas the two outside nozzles 42b are directed at an inward angle toward the middle of the trough. The outside nozzles 42b are angled slightly toward the output end of the trough 40 such that the jets emanating from the outside nozzles are directed at the back of the carcass as it flows through the trough and past the stream from middle nozzle 42a. The outside nozzles 42b are so arranged so that as the poultry carcass passes against the flowing water in the trough it is subjected on the back side to a high pressure stream of ozonated water in order to fully subject the carcass, and especially the feather follicles, to ozonated water since as the carcass flows through the trough and against the flow of water a wake or turbulence is created near the back side and the jets of ozonated water from outside nozzles 42b assure that the entire outer carcasses has had intimate contact with ozonated water. The middle nozzle 42a is directed straight up into the open body cavity of the carcass as it passes through the trough so that the inside of the carcass is also fully immersed and treated with ozonated water for an effective bactericidal wash. The arrows in FIG. 6 shows the streams of water from nozzles 42 and the direction of the flow from the nozzles.

The trough should be of such a length or circumference so that a carcass spends a minimum of one minute in the ozonated water, but less than seven minutes in the water with an optimum sanitizing time of three to five minutes.

Before the partially processed carcasses 9 are brought into the ozonated water treatment zone 12 they are manually loaded onto a rack 32 that holds them stationary on the rack 32. As a result of the evisceration stage and the decapitation stage, the carcass 9 has a hollow inner cavity that runs the length of the body. This carcass 9 must maintain a substantially upright position as it is moved through the trough so that it does not drag behind as it moes through trough 40 against the stream of ozonated water. It is important that the carcass be in the upright position so that the streams of ozonated water from the middle nozzles 42a are able to get inside the inner body cavity of the carcass 9 for an effective inner cavity wash. FIG. 2 shows a rack 32 of the type preferred for maintaining the carcasses in an upright stationary position through the trough 40. The rack 32 has an inverted V-shaped bottom 33 where the carcass can be mounted by inserting the inverted "V" bottom 33 into the body cavity of the carcass 9. A carcass mounted on the rack 32 is shown in FIG. 1. Once the carcasses are loaded onto the moving racks in the aforesaid manner they are totally immersed in the ozonated water trough 40 and carried along upstream against the ozonated flowing water and subjected to the streams of ozonated water from the nozzles 42. As the carcass flows through the trough against the ozonated water stream a turbulent, swirling flow of water is created around the carcass that assures complete contact of ozonated water with the carcass and the streams from the nozzles are included to increase the turbulence to fully assure contact of ozonated water with the inner body cavity and the back of the carcass as it passes through the trough. A general depiction of this is shown in FIG. 5. Once the carcass is through the ozonated water treatment stage it is removed from the trough and can be carried by a conveyor belt to the final processing stages such as packaging or cutting into parts and then packaging as generally denoted by the numeral 30 in FIG. 7.

By subjecting poultry carcasses to ozonated water in the form of an ozonated water trough and ozonated water jets directed to the inner body cavity of the carcass and to the outer carcass, a final product results that is virtually bacterial free and where the bacterial counts of specific disease causing bacteria such as *E. coli*, Enterobacter, and Salmonella are greatly reduced. The poultry product is sanitized on both the inner body cavity and the outer skin. The method of this invention produces a sanitized poultry product suitable for human consumption where the risk of contracting a bacteria caused sickness is dramatically reduced. By so reducing the bacterial flora on and in the poultry carcass, the shelf life of the product is also enhanced in that the risk of rancidity due to bacterial growth is simultaneously reduced.

The ozonated water leaving the ozonated water trough 40 is then allowed to flow directly into the chiller stage trough so that additional sanitizing and disinfecting can be achieved in the chiller stage. In this manner, the ozonated water is efficiently used and the presence of bacteria can be reduced or controlled in this area of the facility also.

From the foregoing, it will be seen that this invention is one well adapted to attain all the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A method for sanitizing poultry carcasses in a poultry processing plant comprising the steps of:
   forming ozonated water;
   chilling said ozonated water;
   flowing said ozonated water into said processing plant in one direction;
   immersing a partially processed carcass into said flowing ozonated water;
   moving said carcass in a direction opposite the direction of movement of said flowing ozonated water;
   directing streams of ozonated water through the interior and against the exterior of said partially processed carcass as it moves through said ozonated water in a manner creating a turbulent flow of water against and around said carcass; and removing said carcass from said ozonated water.

2. A method for sanitizing poultry carcasses in a poultry processing plant as set forth in claim 1 wherein said ozonated water is formed by bubbling an ozone/air mixture into water.

3. A method for sanitizing poultry carcasses in a poultry processing plant as set forth in claim 2 wherein said ozonated water is present at a concentration greater than 0.5 parts per million ozone in water.

4. A method for sanitizing poultry carcasses in a poultry processing plant as set forth in claim 3 wherein said concentration of said ozone in water is between 0.5 parts per million and 0.75 parts per million.

5. A method for sanitizing poultry carcasses in a poultry processing plant as set forth in claim 4 wherein said ozonated water has a temperature of about 33° F.

6. A method for sanitizing poultry carcasses in a poultry processing plant as set forth in claim 5 wherein at least one-half gallon of said ozonated water is formed per carcass passing through said processing plant.

7. A method for sanitizing poultry carcasses in a poultry processing plant as set forth in claim 6 wherein said streams of ozonated water are directed toward said carcasses in a manner forcing streams of ozonated water into the inner body cavity of said carcass for intimate contact with said inner body cavity and in a manner contacting the outer body of said carcass.

8. A method for sanitizing poultry carcasses in a poultry processing plant as set forth in claim 7 wherein said carcass is exposed to said ozonated water for not less than one minute.

9. A method for sanitizing poultry carcasses in a poultry processing plant as set forth in claim 8 wherein said carcass is exposed to said ozonated water for 3 to 5 minutes.

10. A method for sanitizing poultry carcasses in a poultry processing plant as set forth in claim 9 wherein said carcass is exposed to said ozonated water for not greater than 7 minutes.

11. A method for sanitizing poultry carcasses in a poultry processing plant comprising the steps forming ozonated water having a concentration of ozone in water greater than 0.5 parts per million;

chilling said ozonated water to about 33° F.;

flowing said ozonated water into a trough in said processing plant in one direction;

hanging a partially processed carcass with an open body cavity on a rack in a manner permitting the carcass body cavity to be oriented in a generally vertical manner in said trough;

moving said carcass in a direction opposite the direction of movement of said flowing ozonated water;

directing pressurized streams of ozonated water from a plurality of nozzles in the bottom of said trough into the interior of said carcass and against the exterior of said carcass while said carcass is fully immersed in said trough of ozonated water in a matter creating a turbulent flow of water against and around said carcass; and removing said carcass from said ozonated water trough after a treatment period of 3 to 5 minutes.

* * * * *